(12) United States Patent
Kuech et al.

(10) Patent No.: US 8,873,764 B2
(45) Date of Patent: Oct. 28, 2014

(54) ACOUSTIC ECHO SUPPRESSION UNIT AND CONFERENCING FRONT-END

(75) Inventors: Fabian Kuech, Erlangen (DE); Markus Kallinger, Erlangen (DE); Markus Schmidt, Erlangen (DE); Meray Zourub, Erlangen (DE); Marco Diatschuk, Weisendorf (DE); Oliver Moser, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 343 days.

(21) Appl. No.: 13/272,243

(22) Filed: Oct. 13, 2011

(65) Prior Publication Data

US 2012/0076308 A1    Mar. 29, 2012

Related U.S. Application Data

(63) Continuation of application No. PCT/EP2009/003446, filed on May 14, 2009.

(60) Provisional application No. 61/169,436, filed on Apr. 15, 2009.

(51) Int. Cl.
*H04B 3/20*      (2006.01)
*H04M 9/08*      (2006.01)

(52) U.S. Cl.
CPC ................................ H04M 9/082 (2013.01)
USPC ............... 381/66; 381/22; 381/17; 381/96; 381/83; 379/406.01; 379/406.06; 379/406.08; 379/406.12; 379/406.13

(58) Field of Classification Search
CPC ............ H04R 27/00; H04R 3/00; H04R 5/00; H04B 3/20
USPC ................... 381/1, 17–18, 22–23, 83, 96, 66; 379/406.01–406.09
See application file for complete search history.

(56) References Cited

U.S. PATENT DOCUMENTS 5,307,405 A    4/1994    Sih
5,978,473 A    11/1999    Rasmusson
(Continued)

FOREIGN PATENT DOCUMENTS

AU      758211 B2    9/1999
CN      1423515 A     6/2003
(Continued)

OTHER PUBLICATIONS

English translation of Official Communication issued in corresponding Japanese Patent Application No. 2012-505056, mailed on Apr. 2, 2013.

(Continued)

*Primary Examiner* — Disler Paul
(74) *Attorney, Agent, or Firm* — Keating & Bennett, LLP

(57) ABSTRACT

An acoustic echo suppression unit according to an embodiment of the present invention includes and input interface for extracting a downmix signal from an input signal, the input signal including the downmix signal and parametric side information, wherein the downmix and the parametric side information together represent a multichannel signal, a calculator for calculating filter coefficients for an adaptive filter, wherein the calculator is adapted to determine the filter coefficients based on the downmix signal and a microphone signal or a signal derived from the microphone signal, and an adaptive filter adapted to filter the microphone signal or the signal derived from the microphone signal based on the filter coefficients to suppress an echo caused by the multichannel signal in the microphone signal.

5 Claims, 9 Drawing Sheets

(56) References Cited

U.S. PATENT DOCUMENTS

| | | |
|---|---|---|
| 2005/0070243 A1* | 3/2005 | Schobben et al. ............ 455/299 |
| 2005/0135643 A1* | 6/2005 | Lee et al. ...................... 381/309 |
| 2006/0182268 A1 | 8/2006 | Marton |
| 2011/0044461 A1 | 2/2011 | Kuech et al. |

FOREIGN PATENT DOCUMENTS

| | | |
|---|---|---|
| JP | 2005-515737 A | 5/2005 |
| JP | 2008-526162 A | 7/2008 |
| RU | 2 109 408 C1 | 4/1998 |
| RU | 2 180 984 C2 | 5/2000 |
| RU | 2000120915 A | 8/2002 |
| RU | 2010 131 421 A | 2/2012 |
| WO | 99/53673 A1 | 10/1999 |
| WO | 03/061344 A2 | 7/2003 |

OTHER PUBLICATIONS

Official Communication issued in corresponding Chinese Patent Application No. 200980159888.0, mailed on Jul. 3, 2013.
Official Communication issued in International Patent Application No. PCT/EP2009/003446, mailed on Oct. 23, 2009.

* cited by examiner

US 8,873,764 B2

ACOUSTIC ECHO SUPPRESSION UNIT AND CONFERENCING FRONT-END

CROSS-REFERENCE TO RELATED APPLICATIONS

This application is a continuation of copending International Application No. PCT/EP2009/003446, filed May 14, 2009, which is incorporated herein by reference in its entirety, and additionally claims priority from U.S. Application No. US 61/169,436, filed Apr. 15, 2009, which is incorporated herein by reference in its entirety.

BACKGROUND OF THE INVENTION

Embodiments according to the present invention relate to an echo suppression unit and a method for suppressing an acoustic echo, which may be used, for instance, in hands-free telecommunication systems or other acoustic systems that include multichannel loudspeaker playback based on a parametric representation of spatial sound.

Acoustic echoes arise from an acoustic coupling or feedback between loudspeakers and microphones of telecommunication devices. This phenomenon is especially present in hands-free operations. The acoustic feedback signal from the loudspeaker is transmitted back to the far-end subscriber, who notices a delayed version of his own speech. Echo signals represent a very distracting disturbance and can even inhibit interactive, full-duplex communication. Additionally, acoustic echoes can result in howling effects and instability of the acoustic feedback loop. In a full-duplex hands-free telecommunication system, echo control is therefore advisable in order to cancel the coupling between loudspeakers and microphones.

FIG. 9 illustrates the general acoustic echo control problem. The far-end signal, emitted by a loudspeaker, travels to the microphone directly, and through reflected paths. Thus, the microphone does not only capture the local near-end speech but also the echo which is thus fed back to the user on the far-end.

A loudspeaker signal x(n) is provided to a loudspeaker 100, which transforms the loudspeaker signal into an audible oscillation of the medium surrounding the loudspeaker 100. As indicated in FIG. 9, microphone 110 may receive the emitted sound by the loudspeaker 100, which is indicated in FIG. 9 by a curved vector, wherein y(n) denotes a feedback signal from the loudspeaker 100 to the microphone 110.

Apart from the feedback signal y(n), the microphone 110 also records an additional sound signal w(n), which may for instance represent speech by a user. Both acoustic signals are recorded by the microphone 110 and provided, as a microphone signal z(n), to an echo removal unit 120. The echo removal unit 120 also receives the loudspeaker signal x(n). It outputs a signal in which—ideally—the contribution from the loudspeaker signal x(n) is removed from the recorded signal or the microphone signal z(n).

Hence, FIG. 9 illustrates the general setup of the acoustic echo control problem. The loudspeaker signal x(n) is fed back to the microphone signal z(n). An echo removal process removes this echo while—ideally—letting through the desired local near-end signal w(n).

Acoustic echo control represents a well-known problem and various methods to remove the acoustic echoes have been proposed [13]. Below, we briefly recall the approaches to acoustic echo suppression (AES) as, e.g., presented in [8, 9], as they are most suitable in the considered context of spatial audio communication.

When transmitting or playing back audio signals, multichannel systems are often used. In these systems multiple loudspeakers are used to play back sound and/or multiple microphones are used to record spatial sound. Such multichannel systems are, for instance, used in spatial audio teleconferencing systems that do not only transmit audio signals of the different parties, but also preserve spatial information of the recording scenario [12]. In other systems, the spatial information can be provided artificially or changed interactively [5].

In case that spatial audio is applied in telecommunication scenarios, an efficient representation of the multichannel audio signals should be used, while still assuring high audio quality. Parametric spatial audio coding represents a suitable approach to address this challenge. Below, we present practical methods that follow the parametric spatial audio coding paradigm and are especially important in the context of communication.

While multichannel systems as, for instance, the previously mentioned spatial audio coding provide the opportunity of transmitting a plurality of audio signals in a very efficient and bandwidth-saving manner, a straightforward implementation of an echo removal or echo suppression process into such multichannel systems necessitates an application to each and every microphone signal based on each and every loudspeaker signal as output by the multichannel system. This, however, may represent a significant, approximately exponentially growing computational complexity simply due to the high number of microphone and/or loudspeaker signals to be processed. Accordingly, this may necessitate additional costs due to a higher energy consumption, the necessity for a higher data processibility and, eventually, also slightly increased delay.

SUMMARY

According to an embodiment, an acoustic echo suppression unit may have: an input interface for extracting a downmix signal from an input signal comprising the downmix signal and parametric side information, wherein the downmix signal and parametric side information together represent a multichannel signal having at least further channels or a channel number higher than the number of channels in the downmix signal; a calculator for calculating filter coefficients for an adaptive filter, wherein the calculator is adapted to receive the downmix signal, wherein the calculator is further adapted to receive a microphone signal or a signal derived from the microphone signal, wherein the calculator is adapted to determine the filter coefficients based on the received signals; an adaptive filter adapted to receive the filter coefficients from the calculator and adapted to filter the microphone signal or the signal derived from the microphone signal based on the filter coefficients to suppress an echo caused by the multichannel signal in the microphone signal.

According to another embodiment, a method for suppressing an acoustic echo may have the steps of: extracting a downmix signal from an input signal comprising the downmix signal and parametric side information, wherein the downmix signal and the parametric side information together represent a multichannel signal having at least further channels or a channel number higher than the number of channels in the downmix signal; calculating filter coefficients for adaptive filtering based on the downmix signal and the microphone signal or a signal derived from the microphone signal; adaptively filtering the microphone signal or the signal derived from the microphone signal based on the filter coefficients to suppress an echo caused by the multichannel signal in the microphone signal.

According to another embodiment, a conferencing front-end may have: an inventive acoustic echo suppression unit; a multichannel decoder; at least one microphone unit, wherein the multichannel decoder is adapted to decode the downmix signal and the parametric side information to a plurality of loudspeaker signals; wherein the at least one microphone unit is adapted to provide the microphone signal.

According to another embodiment, a method of providing a plurality of loudspeaker signals and a microphone signal may have: the above-stated method of suppressing an acoustic echo; a step of multichannel decoding; a step of receiving a microphone signal, wherein, in the step of multichannel decoding, the downmix signal and the parametric side information are decoded to obtain a plurality of loudspeaker signals. Another embodiment may have a computer program for performing, when running on a processor, the inventive methods.

Embodiments according to the present invention are based on the finding that a more efficient acoustic echo suppression is achievable by extracting a downmix signal from an input signal comprising the downmix signal and parametric side information, calculating filter coefficients for an adaptive filter based on the downmix signal and a microphone signal or a signal derived from a microphone signal, and filtering the microphone signal or the signal derived from the microphone signal based on the calculated filter coefficients. In other words, in the case of a multichannel system based on a downmix signal and parametric side information forming the input signal, wherein the parametric side information together with the downmix signal represent a multichannel signal, the echo suppression may be done based on the downmix signal.

While employing an embodiment according to the present invention, it may be, therefore, possible to avoid decoding the input signal into the multichannel signal and afterwards performing the acoustic echo suppression. It may therefore be possible to reduce the computational complexity significantly since the number of signals is drastically reduced compared to a multichannel system as previously described. By employing an embodiment according to the present invention it is possible to perform the acoustic echo suppression on the basis of the downmix signal comprised in the input signal.

In further embodiments according to the present invention, the echo suppression may be performed based on reference power spectra, which may be determined based on the received downmix signal and the microphone signal or a signal derived from the microphone signal. Optionally, the reference power spectrum derived from the multichannel signal may be delayed by a delay value, which may, for instance, be determined on the basis of a correlation value.

Accordingly, a conferencing front-end according to an embodiment of the present invention does not only comprise an acoustic echo suppression unit according to an embodiment of the present invention but also a multichannel decoder and a least one microphone unit, wherein the multichannel decoder is adapted to decode the downmix signal and the parametric side information into a plurality of loudspeaker signals. The at least one microphone unit is further adapted to provide the microphone signal to the acoustic echo suppression unit. In further embodiments of conferencing front-end the input interface is further adapted to extract the parametric side information, wherein the multichannel decoder comprises an upmixer and a parameter processor. The parameter processor is then adapted to receive the parameter side information from the input interface and to provide an upmix control signal. The upmixer is adapted to receive the downmix signal from the input interface and the upmix control signal from the parameter processor and is adapted to provide the plurality of loudspeaker signals based on the downmix signal and the upmix control signal. Hence, in embodiments according to the present invention, the input interface of the acoustic echo suppression unit may be that of the multichannel decoder or both the multichannel decoder and the acoustic echo suppression unit may share a common input interface.

Furthermore, embodiments according to the present invention may optionally also comprise a corresponding multichannel encoder adapted to encode a plurality of audio input signals into a further downmix signal and further parametric side information together representing the plurality of audio input signals, wherein the microphone signal of the at least one microphone unit is one of the audio input signals of the plurality of audio input signals. In this case, the acoustic echo suppression unit comprised in the conferencing front-end is adapted to receive the further downmix as the derived from the microphone signal.

In other words, as will be presented below, the approach according to embodiments of the present invention allows efficiently combining acoustic echo suppression and parametric spatial audio coding.

BRIEF DESCRIPTION OF THE DRAWINGS

Embodiments of the present invention will be detailed subsequently referring to the appended drawings, in which.

DETAILED DESCRIPTION OF THE INVENTION

With reference to FIGS. 1-9 in the following different embodiments according to the present invention and underlying technologies will be outlined and described in more detail. However, before introducing acoustic echo suppression techniques for single channel acoustic echo suppression and multichannel acoustic echo suppression, an embodiment according to the present invention in the form of a conferencing front-end along with an acoustic echo suppression unit will be described first.

Figure 1:
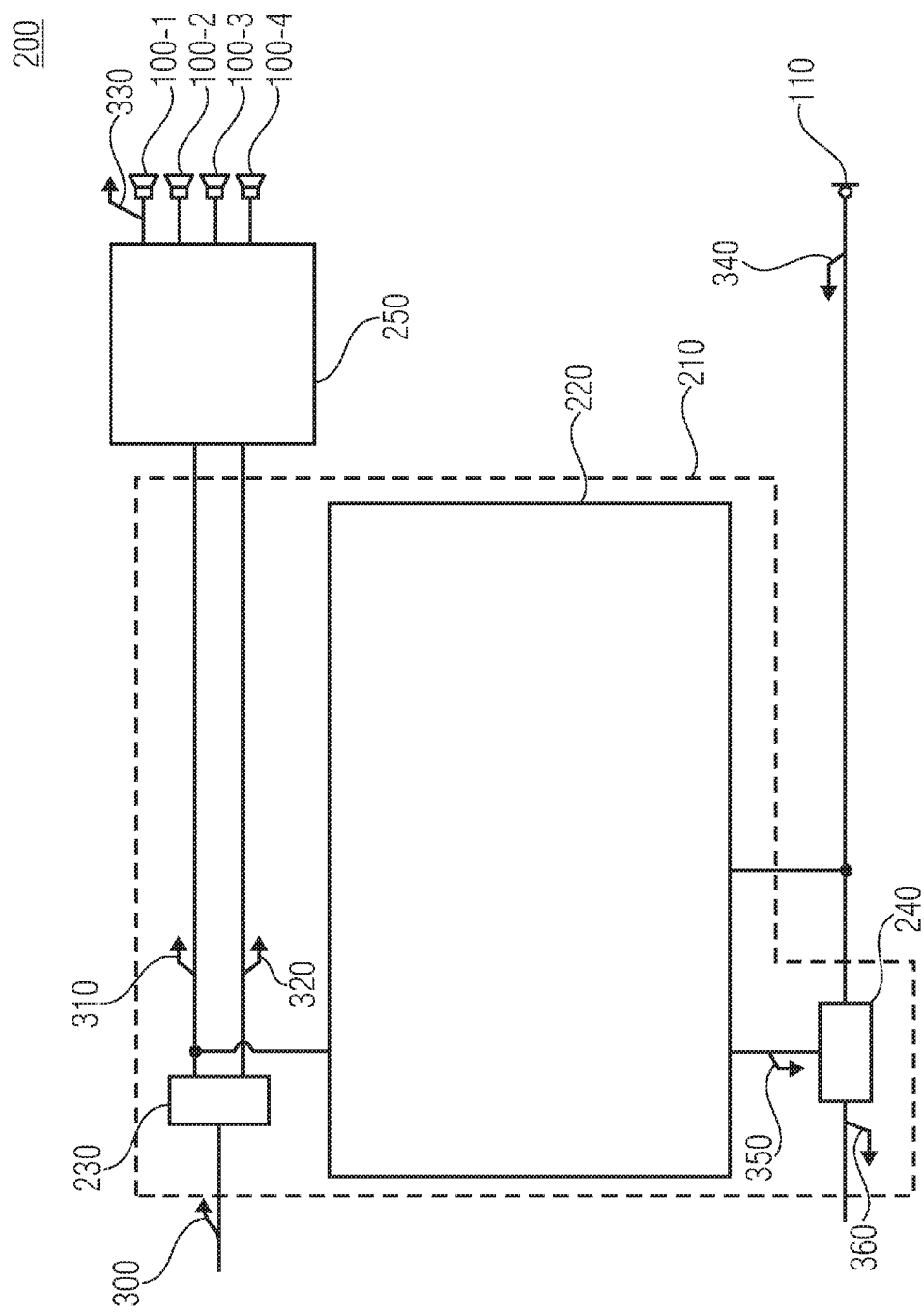
FIG. 1 shows a block diagram of a conferencing front-end comprising an acoustic echo suppression unit according to an embodiment of the present invention.

FIG. 1 shows a block diagram of a conferencing front-end 200 comprising, as a central component, an acoustic echo suppression unit 210 according to an embodiment of the present invention. The acoustic echo suppression unit 210 comprises a calculator 220, an input interface 230 and an adaptive filter 240. The conferencing front-end 200 further comprises a multichannel decoder 250, which is output-wise coupled to a plurality of loudspeakers 100, of which exemplarily four loudspeakers 100-1, . . . , 100-4 are shown. The conferencing front-end further comprises a microphone or microphone unit 110.

To be a little more specific, an input signal 300 is provided, which comprises a downmix signal 310 and parametric side information 320. The input interface 230 separates or extracts from the input signal in the embodiment shown in FIG. 1 both, the downmix signal 310 and the parametric side information 320. In the embodiment shown in FIG. 1, the input interface 230 provides the downmix signal 310 along with the parametric side information 320 to multichannel decoder 250.

The multichannel decoder 250 is adapted to decode the downmix signal 310 and the parametric side information 320 into a plurality of loudspeaker signals 330, of which, for the sake of simplicity only, in FIG. 1 only one is labeled as such. Since the loudspeakers 100 are coupled to appropriate outputs of the multichannel decoder 250, the loudspeakers 100 receive the individual loudspeaker signals 330 and transform them back into audible acoustic signals.

The calculator 220 is furthermore coupled to an output of the input interface 230 in which the downmix channel 310 is available. Hence, the calculator 220 is adapted to receive the downmix signal 310. However, in the embodiment shown in FIG. 1, the parametric side information 320 of the input signal 300 are not provided to the calculator 220. In other words, in embodiments according to the present invention, the calculator 220 may use the downmix signal alone in terms the signals comprised in the input signal.

The microphone 110 is output-wise coupled to both, the calculator 220 and the adaptive filter 240. As consequence, the calculator 220 is also adapted to receive a microphone signal 340 as provided by the microphone 110. Based on the microphone signal 340 and the downmix signal 310, the calculator 220 is adapted to determine filter coefficients for the adaptive filter 240 and to provide a corresponding filter coefficient signal 350 to the adaptive filter 240 on the basis of which the adaptive filter 240 filters the incoming microphone signal 340. The adaptive filter 240 provides at its output an output signal, which is an echo suppressed version of the microphone signal 340.

Further details concerning the mode of operation of a possible implementation of a calculator 220 will be given below.

Although the input interface 230 is drawn schematically in FIG. 1 as an individual component of the acoustic echo suppression unit 210, the interface 230 may also be part of the decoder 250 or may be shared by both, the decoder 250 and the acoustic echo suppression unit 210. Furthermore, it is possible to implement embodiments according to the present invention, for instance, by implementing an input interface 230 which is capable of extracting the downmix signal 310 alone. In this case, the input signal 300 would be provided to the multichannel decoder 250, which in turn comprises an appropriate interface being capable of extracting both, the downmix signal 310 and parametric side information 320. In other words, it may be possible to implement an acoustic echo suppression unit 210 with an input interface 230 which is not capable of extracting the parametric side information but only the downmix signal 310.

Embodiments according to the present invention represent an efficient method for the suppression of acoustic echoes for multichannel loudspeaker systems used in spatial audio communication systems. The method is applicable in case that the spatial audio signals are represented by a downmix signal and corresponding parametric side information or metadata. These parameters capture the information that is necessitated for computing the loudspeaker signals on the reproduction side. The invention exploits the fact that the echo suppression can be performed directly based on the received downmix signal rather than explicitly computing the loudspeaker signals before they are input into the acoustic echo suppression (AES). Analogously, the echo components can also be suppressed in the downmix signal of the spatial audio signal to be transmitted to the far-end. This approach typically is also more efficient than applying the echo suppression to each of the recorded signals of the microphones used to capture the observed sound field.

In the following, summarizing reference signs will be used for object which appear more than once in an embodiment or a figure, but which are nevertheless equal or similar at least in terms of some of their features or structures. For instance, in FIG. 1 the four loudspeakers 100-1, . . . , 100-4 have been denoted with individual reference signs, however, when their basic properties or features as being loudspeakers are discussed, reference was made to the "loudspeakers 100".

Furthermore, to simplify the description, similar or equal objects will be denoted with the same or similar reference signs. Comparing FIGS. 1 and 9, the loudspeakers have been referenced with the equal reference sign 100. Objects denoted by the same or similar reference signs may be implemented identically, similarly or differently. For instance, in some implementations it might be advisable to implement different types of loudspeakers 100 for the different loudspeaker signals, while in different applications the loudspeakers may be implemented identically. Therefore, object denoted by the same or similar reference sign may optionally be implemented identically or similarly.

Moreover, it should be noted that when several objects appear more than once in a figure, the depicted number of objects is typically for illustrative purposes only. Deviations from the number may be made either by increasing or decreasing the number. For instance, FIG. 1 shows four loudspeakers 100-1, . . . , 100-4. However, in different embodiments more or less loudspeakers 100 may equally well be implemented. For instance, in the case of a "5.1"-system, 5 loudspeakers along with a sub-woof loudspeaker are typically used.

In the following we briefly recall the general approach of acoustic echo suppression. Thereby, we basically follow the method as described in [8, 9].

Figure 9:
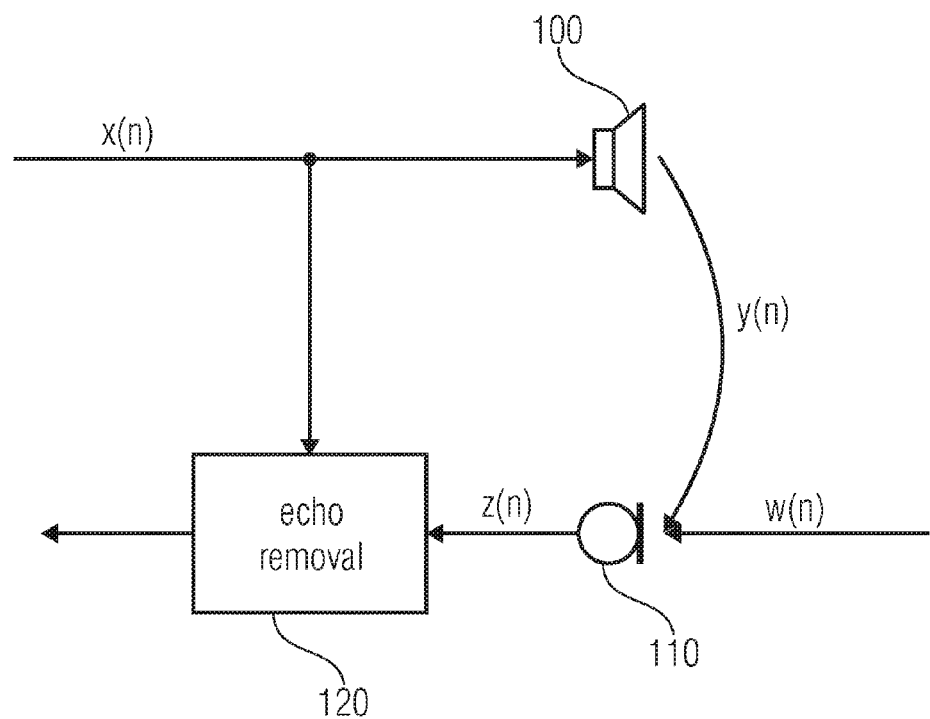
FIG. 9 illustrates the general setup of an acoustic echo control problem.

As illustrated in FIG. 9, the microphone signal z(n) is composed of the acoustic echo signal y(n) that results from the feedback of the loudspeaker signal x(n) and the near-end signal w(n). Here, we assume that the room impulse response can be expressed as a combination of a direct propagation path corresponding to a delay of d samples between the loudspeaker signal x(n) and the microphone signal z(n), and a linear filter $g_n$ which models the acoustic properties of the enclosure.

Then, the microphone signal z(n) can be expressed by $$z(n) = g_n * x(n-d) + w(n), \qquad (1)$$

where * denotes convolution. The short-time Fourier transform (STFT) domain representation of equation (1) is given by $$Z(k, m) = G(k, m) X_d(k, m) + W(k, m), \qquad (2)$$

where k is a block time index and m denotes a frequency index. $X_d(k, m)$ is defined as the STFT-domain correspondence of the delayed loudspeaker signal. The first term on the right hand side of equation (2) represents the echo components $Y(k, m)$, where $$Y(k, m) = G(k, m) X_d(k, m). \tag{3}$$

It should be noted that the following discussion of acoustic echo suppression refers to the STFT as spectral representation of signals. However, the concept can obviously also be applied to any other suitable frequency subband representation instead.

The acoustic echo suppression is performed by modifying the magnitude of the STFT of the microphone signal $Z(k, m)$, while keeping its phase unchanged. This can be expressed by $$E(k, m) = H(k, m) Z(k, m), \tag{4}$$

where $H(k, m)$ represents a real-valued, positive attenuation factor. In the following we refer to $H(k, m)$ as echo suppression filter (ESF).

A practical approach to the computation of the echo suppression filter $H(k, m)$ is to use a parametric spectral subtraction approach analogously to [7]:

$$H(k, m) = \left( \frac{|Z(k, m)|^\alpha - \beta |\hat{Y}(k, m)|^\alpha}{|Z(k, m)|^\alpha} \right)^{\frac{1}{\gamma}}, \tag{5}$$

where $\alpha$, $\beta$, and $\gamma$ represent design parameters to control the echo suppression performance.

Typical values for $\beta$ and $\gamma$ are values around 2, while in some applications $\alpha$ is chosen to be the inverse of $\gamma$. In other words, when choosing typical values of $\beta=2$ and $\gamma=2$, $\alpha$ is typically chosen to be 0.5 (=½).

The estimate of the power spectrum of the echo signal can be obtained by $$|\hat{Y}(k, m)|^2 = |\hat{G}(k, m)|^2 |X_d(k, m)|^2, \tag{6}$$

where $|\hat{G}(k, m)|^2$ represents an estimate of the echo power transfer function $|G(k, m)|^2$. Alternatively, a complex spectrum based approach according to $$|\hat{Y}(k, m)|^2 = |\hat{G}(k, m) X_d(k, m)|^2, \tag{7}$$

can be used.

Note that in practice both the echo power transfer function $|G(k, m)|^2$ and the delay d are not known and have to be replaced by corresponding estimates, as discussed next. In the following we will refer to $|\hat{G}(k, m)|^2$ as echo estimation filter (EEF).

One possible method to estimate the EEF has been proposed in [8]. Assuming that the near-end speaker is silent, equation (2) implies that the EEF may be estimated by $$|\hat{G}(k, m)|^2 = \left| \frac{E\{Z(k, m) X_d^*(k, m)\}}{E\{X_d(k, m) X_d^*(k, m)\}} \right|^2, \tag{8}$$

where * denotes the complex conjugate operator, and $E\{\ldots\}$ denotes the expectation operator. The expectation operator may be approximated by a floating average of its argument.

The above technique effectively estimates the echo path transfer function and takes the magnitude thereof to obtain the real-valued EEF. Whenever the phase changes abruptly, such as during echo path changes, time drift, etc., this EEF estimation may have to re-converge. To make equation (8) insensitive to phase variations, it can be modified to be computed from the power spectra rather than from the complex spectra [6]:

$$|\hat{G}(k, m)|^2 = \frac{E\{|X_d(k, m)|^2 |Z(k, m)|^2\}}{E\{|X_d(k, m)|^2 |X_d(k, m)|^2\}}. \tag{9}$$

In [6] it is shown that the estimate according to (9) is biased. Thus, in [6] it is proposed to use another approach to estimate the EEF, namely to estimate $|G(k, m)|^2$ based on temporal fluctuations of the power spectra of the loudspeaker and microphone signals. The temporal fluctuations of the power spectra may be computed according to $$\tilde{Z}(k, m) = |Z(k, m)|^2 - E\{|Z(k, m)|^2\} \tag{10}$$

$$\tilde{X}_d(k, m) = |X_d(k, m)|^2 - E\{|X_d(k, m)|^2\}. \tag{11}$$

The estimation of the EEF is then performed analogously to equation (9), but based on the fluctuating spectra of the loudspeaker and the microphone:

$$|\hat{G}(k, m)|^2 = \frac{E\{\tilde{X}_d(k, m) \tilde{Z}(k, m)\}}{E\{\tilde{X}_d(k, m) \tilde{X}(k, m)\}}. \tag{12}$$

It is important to note that the fluctuating power spectra are only used for the estimation of $|G(k, m)|^2$. The computation of the echo suppression filter $H(k, m)$ is still based on the original power spectra of the loudspeaker and microphone signals.

The delay value d can be estimated using the squared coherence function with respect to the loudspeaker and microphone power spectra according to $$\Gamma_d(k, m) = \frac{(E\{|X(k-d, m)|^2 |Z(k, m)|^2\})^2}{E\{|X(k-d, m)|^2 |X(k-d, m)|^2\} E\{|Z(k, m)|^2 |Z(k, m)|^2\}}, \tag{13}$$

In general, the delay d can then be chosen different for each frequency bin m. Here, however, we consider one single delay for all frequencies. Therefore, we compute an echo prediction gain $\omega_d(k)$ as the mean of $\Gamma_d(k, m)$ over frequency $$\omega_d(k) = \frac{1}{M} \sum_{m=0}^{M-1} \Gamma_d(k, m), \tag{14}$$

where M denotes the number of frequency bins. Then, d is chosen such that the echo prediction gain is maximized, i.e., $$d = \arg\max_d \{\omega_d(k)\} \tag{15}$$

Alternatively to equation (15), the estimation of the delay value d can also be performed with respect to the fluctuating spectra, i.e., based on equations (10), (11).

Note that in practice, the mathematical expectation $E\{\ldots\}$, used in the derivations above, may have to be replaced by corresponding short-time or floating averages. To give an example, we consider $$\Phi_{AB}(k, m) = E\{A(k,) B(k, m)\}. \tag{16}$$

The short-time average $\hat{\Phi}_{AB}(k, m)$ corresponding to $\Phi_{AB}(k, m)$ can, for instance, be obtained by recursive smoothing according to $$\hat{\Phi}_{AB}(k, m) = (1-\alpha_{avg}) \hat{\Phi}_{AB}(k-1, m) + \alpha_{avg} A(k, m) B(k, m). \tag{17}$$

The factor $\alpha_{avg}$ determines the degree of smoothing over time and may be adjusted to any given requirements.

In the following we discuss, how the single channel AES described in the previous section can analogously be applied to multichannel AES, too.

Let $X_l(k, m)$ denote the STFT-domain representation of the l-th loudspeaker signal. A joint power spectrum for all loudspeaker channels is then computed by combining the power spectra of the individual loudspeaker signals:

$$|X(k, m)|^2 = \sum_{l=0}^{L-1} |X_l(k, m)|^2, \quad (18)$$

where L denotes the number of loudspeaker channels.

Alternatively, the joint power spectrum of the loudspeaker signals may be obtained from adding the spectrum of each loudspeaker signal and then taking the squared magnitude of the joint spectrum:

$$|X(k, m)|^2 = \left|\sum_{l=0}^{L-1} X_l(k, m)\right|^2. \quad (19)$$

Analogously, a joint power spectrum is computed for the microphone channels according to $$|Z(k, m)|^2 = \sum_{p=0}^{P-1} |Z_p(k, m)|^2, \quad (20)$$

where $Z_p(k, m)$ represents the signal of the p-th microphone, and P denotes the number of microphones.

As in case of the loudspeaker signals, the joint microphone power spectrum can alternatively be computed according to $$|Z(k, m)|^2 = \left|\sum_{p=0}^{P-1} Z_p(k, m)\right|^2. \quad (21)$$

The desired model for the power spectrum of the echo is given analogously to equation (2), when assuming statistical independence of the loudspeaker signals and the near-end signals:

$$|Z(k, m)|^2 \approx |G(k, m)|^2 |X_d(k, m)|^2 + |W(k, m)|^2. \quad (22)$$

where in the multichannel case the power spectra $|X(k, m)|^2$ and $|Z(k, m)|^2$ are given by equations (18) and (20), respectively.

For determining the echo estimation filter $|G(k, m)|^2$ and the delay value d, respectively, we may also apply the different methods discussed in above, but using the joint loudspeaker and microphone power spectra defined here.

The actual echo suppression is then performed for each microphone signal separately, but by using the same echo removal filters for each microphone channel:

$$E_p(k, m) = H(k, m) Y_p(k, m) \quad (23)$$

for $p=0, 1, \ldots, P-1$.

In this section we will review some important examples of parametric spatial audio representation and parametric spatial audio coding. Thereby, we consider the approaches Directional Audio Coding (DirAC) [12], MPEG Surround (MPS) [1], and MPEG Spatial Audio Object Coding (SAOC) [5]. Before looking into specific details of the different coding approaches, we consider the basic encoder/decoder structures which are common for all methods discussed here.

Figure 2:
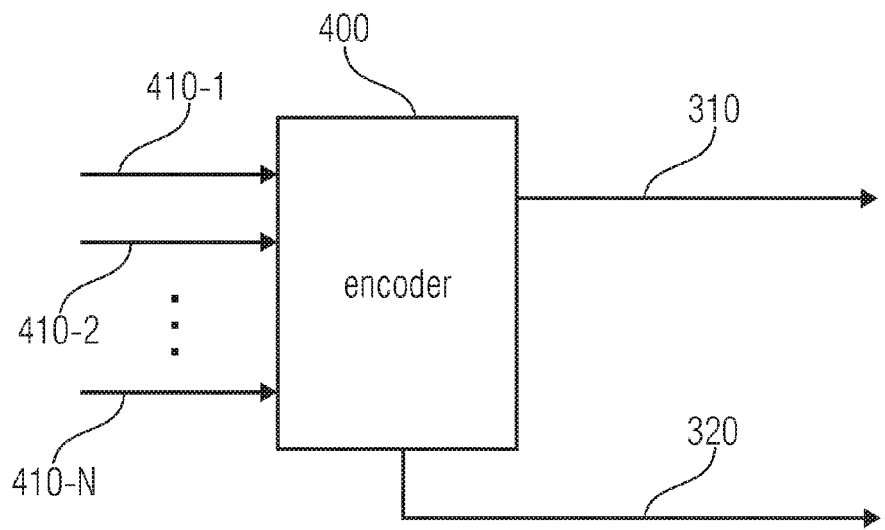
FIG. 2 illustrates a general structure of a parametric spatial audio encoder.

The general structure of a parametric spatial audio encoder is illustrated in FIG. 2. FIG. 2 shows a multichannel or a parametric spatial audio encoder 400. The encoder takes multiple audio signals as input and outputs a downmix signal of one or more channels and the corresponding parametric side information. To be a little more specific, the multichannel encoder 400 is provided with a plurality of input signals 410-1, ..., 410-N, which may, in principle, be any audio signal. Based on the input signals 410, the encoder 400 provides a downmix signal 310 and parametric side information 320, which together represent the plurality of input signals 410. In many cases and implementations of a multichannel encoder 400 this representation is typically not lossless.

The encoder takes as input multiple audio channels. Depending on the actual coding approach, these audio input channels can represent microphone signals [12], loudspeaker signals [10], or the input signals correspond to so-called spatial audio objects [5]. The output of the encoder is the downmix signal 310 and corresponding side information 320. The downmix signal comprises one or more audio channels. The side information includes parametric metadata, representing the observed sound field, the relation between different input channels, or the relation between different audio objects. The output of the encoder, i.e. the combination of the downmix signal and the side information, is called spatial audio stream or spatial audio representation in the following.

Figure 3:
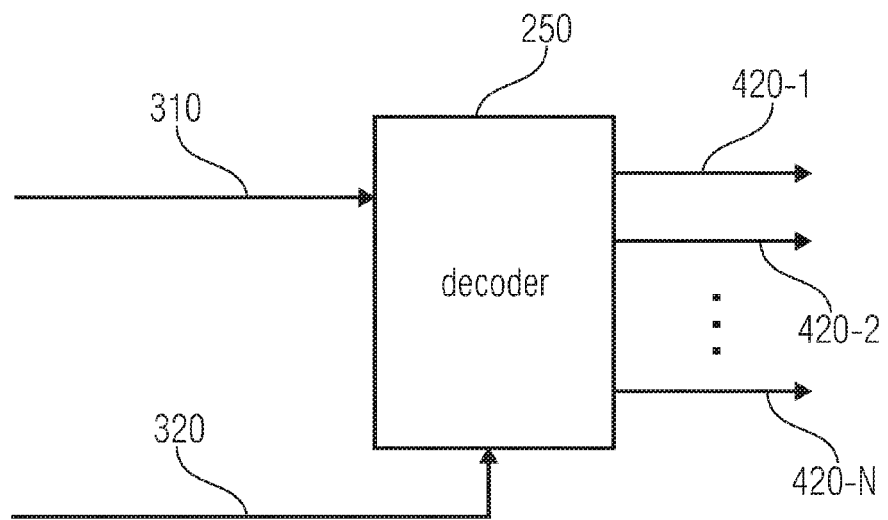
FIG. 3 illustrates a general structure of a parametric spatial audio decoder.

The general structure of a corresponding parametric spatial audio decoder is illustrated in FIG. 3. FIG. 3 shows a (multichannel) decoder 250, which takes a downmix signal 310 and corresponding parametric side information 320 as input. The multichannel decoder 250 outputs a plurality of output signals 420-1, ..., 420-N, which may be, for instance, loudspeaker signals (e.g. loudspeaker signals 330 as shown in FIG. 1) corresponding to a desired playback configuration. As can be seen, the decoder takes the spatial audio stream as input. Based on the downmix signal and the metadata included in the side information, the decoder computes loudspeaker signals corresponding to a desired playback configuration. Typical loudspeaker setups are, for instance, described in [1].

One example of a parametric spatial audio coding scheme is directional audio coding, which is also referred to as DirAC. DirAC uses a parametric representation of a sound field using the direction-of-arrival (DOA) and diffuseness of sound in frequency subbands. Hence, it only takes features into account that are relevant for human hearing. The DirAC approach is based on the assumption that interaural time differences (ITD) and the interaural level differences (ILD) are perceived correctly, if the direction-of-arrival of a sound field is correctly reproduced. Correspondingly, the interaural coherence (IC) is assumed to be perceived correctly, if the diffuseness of a sound field is reproduced correctly. In this way the reproduction side only needs the direction and diffuseness parameters and a mono microphone signal to generate features that are relevant for human perception of spatial audio at a given listening position with an arbitrary set of loudspeakers.

In DirAC, the desired parameters (i.e. DOA $\phi(k, m)$ of sound and the diffuseness $\Psi(k, m)$ in each frequency band) are estimated via an energetic analysis of the sound field [12] based on B-format microphone signals. B-format microphone signals typically comprise an Omni directional signal W(k, m), and two dipole signals ($U_x(k, m)$, $U_y(k, m)$) corresponding to the x-, y-direction of a Cartesian coordinate system. The B-format signals may be directly measured using, for instance, sound field microphones [2]. Alternatively an array of Omni directional microphones can be used to generate the necessitated B-format signals [11].

On the reproduction side (decoder), the different loudspeaker signals are computed based on a mono downmix signal together with the direction and diffuseness parameters. The loudspeaker signals are composed of signal components corresponding to direct sound and to diffuse sound, respectively. The signal of the pth loudspeaker channel can, for instance, be computed according to $$X_p(k, m) = g_p(k, m)\sqrt{1-\Psi(k,m)} W(k, m) + \sqrt{\Psi(k,m)} D_p\{W(k, m)\}, \quad (24)$$

where $\Psi(k, m)$ denotes the diffuseness at frequency subband m and block time index k. The panning gain $g_p(k, m)$ depends on both the DOA of sound $\phi(k, m)$ and the position of the loudspeaker p relative to the desired listening position. The operator $D_p\{\ldots\}$ corresponds to a decorrelator. The decorrelator is applied to the downmix signal W(k, m) when computing the pth loudspeaker signal.

From the above discussion it follows that the microphone signals (B-format or array of Omni directional microphones) represent the input of the DirAC encoder 400. The output of the encoder is given by the downmix signal W(k, m) and the direction $\phi$ (k, m) and diffuseness ($\Psi(k, m)$) parameters as side information.

Correspondingly, the decoder 250 takes the downmix signal W(k, m) and the parametric side information $\phi$ (k, m) and $\Psi(k, m)$ as input to compute the desired loudspeaker signals according to (24).

MPEG Surround (MPS) represents an efficient approach to high-quality spatial audio coding [10]. A complete specification of MPS can be found in [1]. In the following we will not look into the details of MPS, but rather review those parts that are relevant in the context of embodiments according to the invention.

MPS exploits the fact that, from a perceptual point of view, multichannel audio signals typically comprise significant redundancy with respect to the different loudspeaker channels. The MPS encoder takes multiple loudspeaker signals as input, where the corresponding spatial configuration of the loudspeakers has to be known in advance. Based on these input signals, the MPS encoder 400 computes spatial parameters in frequency subbands, such as channel level differences (CLD) between two channels, inter channel correlation (ICC) between two channels, and channel prediction coefficients (CPC) used to predict a third channel from two other channels. The actual MPS side information 320 is then derived from these spatial parameters. Furthermore, the encoder 400 computes a downmix signal which may comprise one or more audio channels.

In the mono case, a downmix signal B(k, m) obviously comprises only one channel B(k, m), whereas in the stereo case, the downmix signal may be written as $$B(k, m) = [B_1(k, m), B_2(k, m)], \quad (25)$$

where, for instance, $B_1(k, m)$ corresponds to the left loudspeaker channel and $B_2(k, m)$ denotes the right loudspeaker channel of a common stereo loudspeaker configuration.

The MPS decoder 250 takes the downmix signal and the parametric side information as input and computes the loudspeaker signals 330, 420 for a desired loudspeaker configuration. The general structure of the signal processing chain used in the MPEG surround decoder is illustrated in FIG. 4 for the stereo case.

Figure 4:
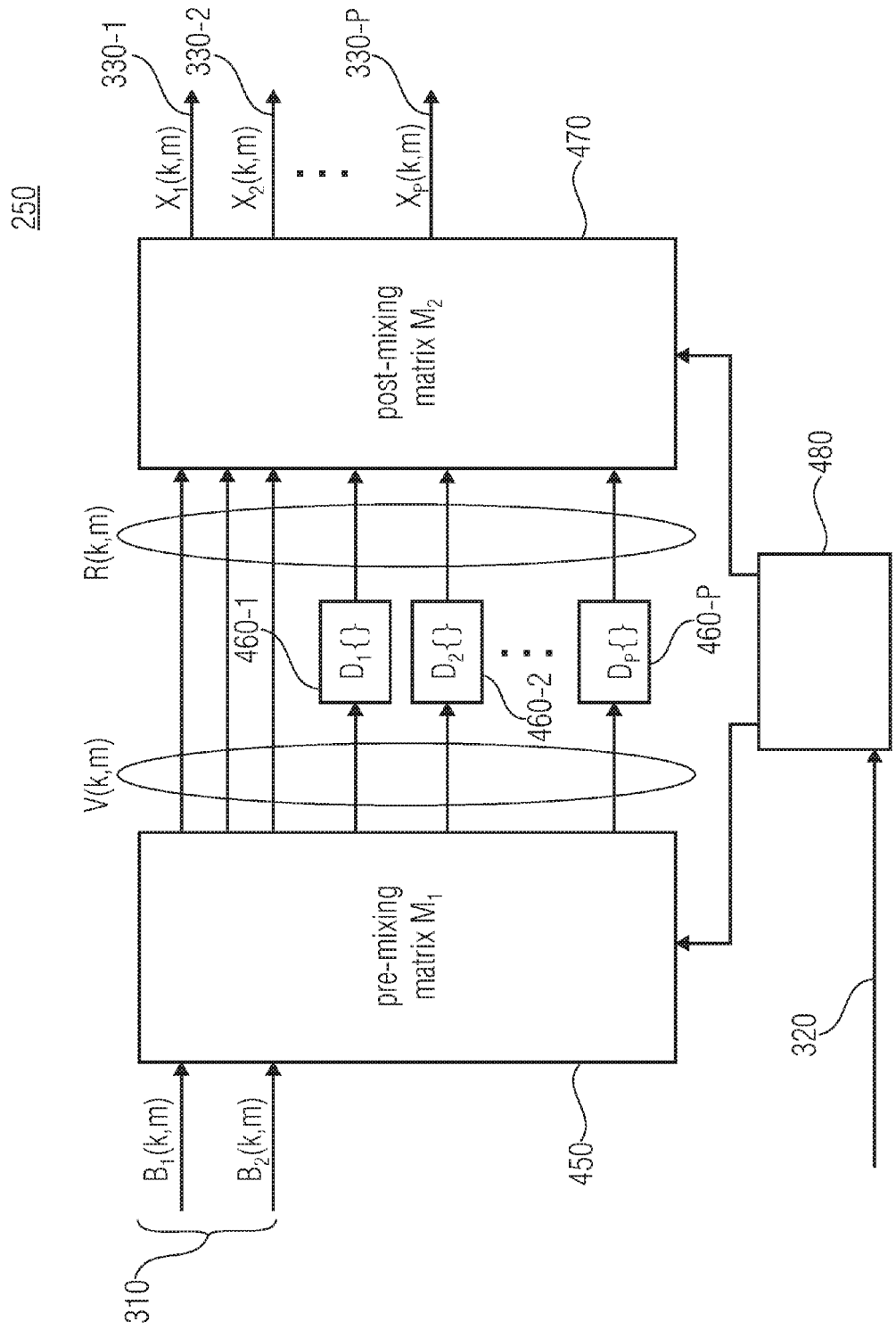
FIG. 4 illustrates a signal processing chain used in the MPEG surround (MPS) decoder.

FIG. 4 shows a schematic representation of a MPEG surround decoder 250. To the decoder 250 the downmix signal 310 and parametric side information are provided. The downmix signal 310 comprises the downmix signal channels $B_1$(k, m) and $B_2$(k, m), which correspond to the left and right loudspeaker channels of a common stereo configuration.

In a pre-mixing matrix 450 ($M_1$) the two channels of the downmix signal 310 are transformed into an intermediate signal vector V(k, m). Parts of the components of the intermediate signal vector V(k, m) are then provided to a plurality of decorrelators 460-1, ..., 460-P that decorrelate the respective components of the intermediate signal vector. The signals provided by the decorrelators 460 along with the undecorrelated signals or signal components of the intermediate signal vector V(k, m) form a second intermediate signal vector R(k, m), which in turn is provided to the post-mixing matrix 470 ($M_2$). The post-mixing matrix 470 provides at its output a plurality of loudspeaker signals 330-1, ..., 330-P, which represent the outputs signals 420 in terms of the decoder shown in FIG. 3.

The decoder 250 further comprises a parameter processor 480 to which the parametric side information 320 are provided. The parameter processor 480 is coupled to both, the pre-mixing matrix 450 as well as the post-mixing matrix 470. The parameter processor 480 is adapted to receive the parametric side information 320 and to generate corresponding matrix elements to be processed by the pre-mixing matrix 450 and the post-mixing matrix 470. To facilitate this, the parameter processor 480 is coupled to both the pre-mixing matrix 450 and the post-mixing matrix 470.

As implied by FIG. 4, the decoding process may be written in matrix notation according to $$V(k, m) = M_1(k, m) B(k, m), \quad (26)$$

$$X(k, m) = M_2(k, m) R(k, m). \quad (27)$$

Following [1], $M_1(k, m)$ denotes the pre-mixing matrix 450 and $M_2(k, m)$ the post-mixing matrix 470. Note that the elements of $M_1(k, m)$ and $M_2(k, m)$ depend on the spatial side information and the loudspeaker configuration used for playback, Which may be provided by the parameter processor 480.

As can be seen from FIG. 4, the relation between the intermediate signal vectors V(k, m) and R(k, m) are given as follows: One part of the signal vector elements $V_p(k, m)$ is kept unchanged ($R_p(k, m) = V_p(k, m)$), while the other components of R(k, m) are decorrelated versions of the corresponding elements of V(k, m), i.e., $R_l(k, m) = D_l\{(k, m)\}$, wherein $D_l\{(k, m)\}$ describes a decorrelator operator. The elements of the signal vector X(k, m) correspond to the multichannel loudspeaker signals $X_p(k, m)$ used for playback.

It should be noted that MPS assumes loudspeaker channels as input, whereas in teleconferencing systems the input consists of recorded microphone signals. A conversion of the microphone input signal to corresponding loudspeaker channels may be necessitated before MPS can be applied for determining the desired efficient spatial audio representation of the recorded sound. One possible approach is to simply use multiple directional microphones which are arranged such that the loudspeaker channels can be directly computed by a combination of the microphone input signals. Alternatively, a DirAC-based computation of the loudspeaker channels may be applied, comprising a direct connection of a DirAC encoder and a DirAC decoder as described in the previous sections.

Spatial Audio Object Coding (SAOC) is based on the concept of representing a complex audio scene by a number of single objects together with a corresponding scene description. In order to implement an efficient way to achieve this goal, SAOC applies techniques that are closely related to MPS [5]. As before, we will only consider those parts of the SAOC concept that are relevant in the context of this invention. More details can be found, for instance, in [5].

The general structure of an SAOC encoder is shown in FIG. 2, where the input signals 410 correspond to audio objects. From these input signals 410, the SAOC encoder 400 computes a downmix signal 310 (mono or stereo) along with corresponding parametric side information 320 representing the relation of the different audio objects in the given audio scene. Similar to MPS, these parameters are computed for each block time index and each frequency subband. These parameters include Object Level Differences (OLD), Inter-Object Cross Coherence (IOC), Object Energies (NRG), and other, downmix signal-related measures and parameters [5].

The SAOC decoder 250 takes the downmix signal 310 together with the corresponding side information 320 as input, and outputs the loudspeaker channel signals for a desired loudspeaker configuration. The SAOC decoder also uses the MPS rendering engine for determining the final loudspeaker signals. Note that in addition to the side information generated by the SAOC encoder 400, the SAOC decoder 250 takes also information of the loudspeaker configuration used for rendering, or other interactive information with respect to controlling specific audio objects, as input for computing the final output signals. This is illustrated in FIG. 5.

Figure 5:
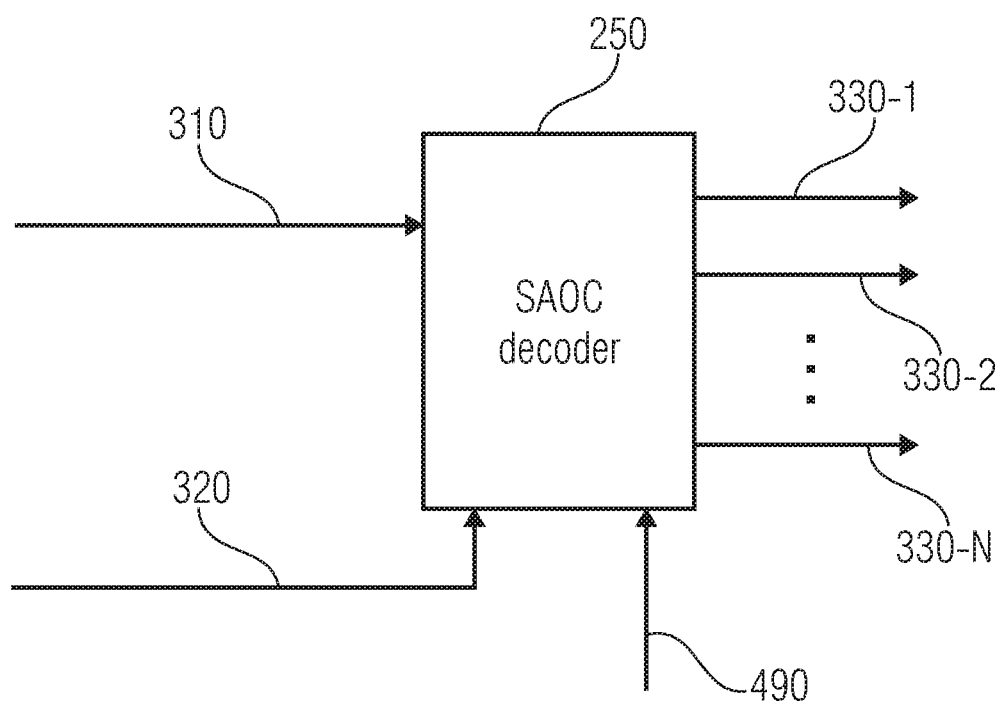
FIG. 5 illustrates a general structure of a spatial audio object coding (SAOC) decoder.

FIG. 5 illustrates the general structure of a SAOC decoder 250. To the SAOC decoder 250 a downmix signal 310 along with the parametric side information 320 are provided. Additionally, the SAOC decoder 250 is also provided with rendering or interaction information 490. As described above, the SAOC decoder 250 takes the downmix signal 310, the parametric side information 320 along with a rendering/interaction parameter 490 to generate a plurality of loudspeaker signals 330-1, . . . , 330-N. These signals are output by the SAOC decoder 250.

Let us now consider the SAOC decoder for the case of a mono downmix signal and a stereo downmix signal, respectively. Following [5], the structure of the SAOC decoder is illustrated in FIG. 6(a) for a mono downmix and in FIG. 6(b) for the stereo case.

Figure 6A:
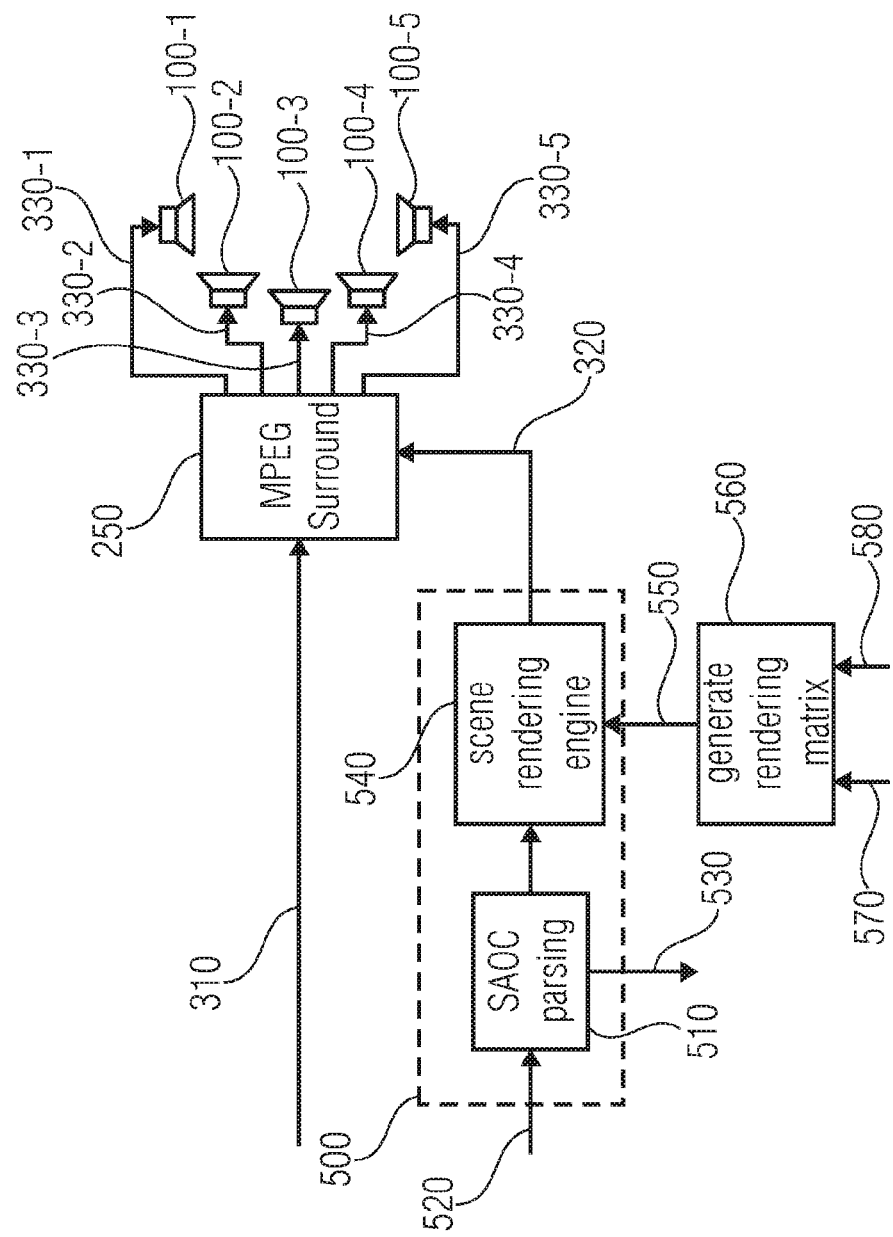
FIG. 6a illustrates a monodownmix based transcoder for transcoding SAOC-data to MPS-data.

FIG. 6a illustrates more specific details concerning a mono downmix-based transcoder, which may be used as an SAOC-to-MPS-transcoder according to [5]. The system shown in FIG. 6a comprises an MPEG surround decoder 250, to which a downmix signal 310 and a MPEG surround bitstream as parametric side information 320 is provided. The MPEG surround decoder 250 outputs in the situation shown in FIG. 6a at least five loudspeaker signals 330-1, . . . , 330-5. Optionally, the MPEG surround decoder 250 may also output further loudspeaker signals, such as a sub-woof-loudspeaker signal. However, a corresponding sub-woof-loudspeaker is not shown in FIG. 6a for the sake of simplicity, while corresponding loudspeakers 100-1, . . . , 100-5 for each of the loudspeakers 330 are shown in FIG. 6a.

While the downmix bitstream 310 is directly provided to the MPEG surround decoder 250, the parametric side information 320 is provided by SAOC-to-MPS transcoder 500, the transcoder 500 comprises SAOC parsing unit 510 to which an SAOC bitstream as an input signal 520 is provided. The SAOC parsing unit 510 provides as one of its output signals information concerning a number of objects 530.

The SAOC parsing unit 510 is furthermore coupled to a scene rendering engine 540, which processes data received from the SAOC parsing unit 510 based on a rendering matrix 550 generated by a rendering matrix generator 560 the corresponding side information 320 for the MPEG surround decoder 250. Accordingly, the scene rendering engine 540 and its output at which the side information 320 are provided to the MPEG surround decoder 250 also represent the output of the transcoder 500.

The rendering matrix generator 560 is provided with information concerning the playback configuration 570 as well as with information concerning the object positions 580 on the basis of which the rendering matrix generator 560 provides the rendering matrix 550.

The mono downmix decoding comprises transcoding the SAOC side information to MPS side information 520, based on the given object positions 580 and the loudspeaker configuration 570 used for the playback. The so-determined MPS side information 320 is fed into the MPS decoder 250 together with the SAOC mono downmix signal 310. Since the downmix signal 310 remains unchanged, the computation of the loudspeaker signals can also be expressed according to equations (26), (27), where the pre-mixing matrix $M_1(k, m)$ and the post-mixing matrix $M_2(k, m)$ are determined from the SAOC-to-MPS transcoder.

Figure 6B:
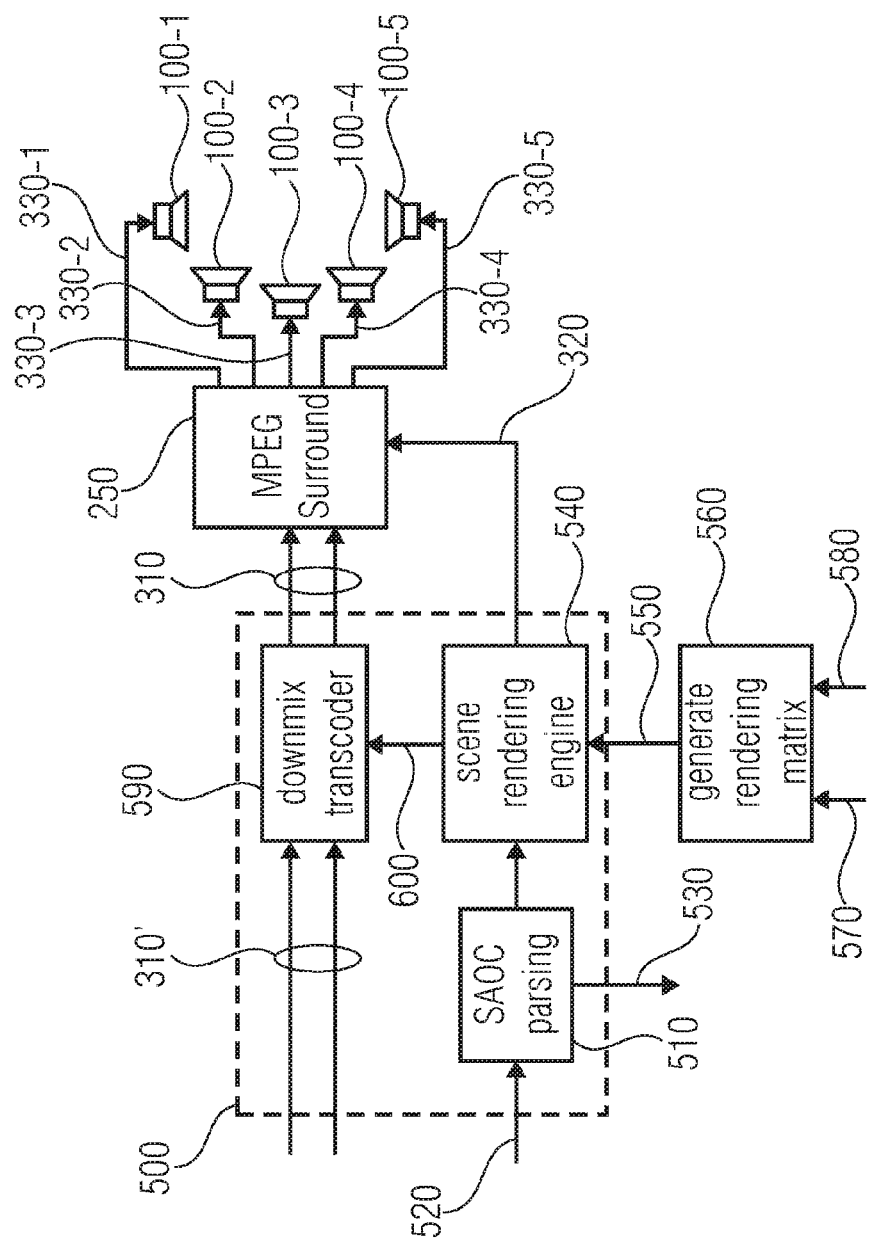
FIG. 6b illustrates a stereo downmix based transcoder for transcoding SAOC-data to MPS-data.

FIG. 6b shows a similar SAOC-to-MPS transcoder 500 compared to the corresponding transcoder 500 shown in FIG. 6a. Therefore, reference is made to the description above. However, both the system as well as the transcoder 500 differ mainly with respect to the downmix signal 310, which is in the situation depicted in FIG. 6b a stereo downmix signal. Accordingly, the MPEG surround decoder 250 differs from the corresponding MPEG surround decoder of FIG. 6a by the fact that the downmix signal 310 comprises two channels such that the decoder 250 is adapted to generate the loudspeaker signals 330 on the basis of the side information 320 and the stereo downmix signal 310.

The system shown in FIG. 6b differs from the system shown in FIG. 6a with respect to further details. The transcoder 500 further comprises a downmix transcoder 590 which receives and original downmix signal 310' as well as control information 600 from the scene rendering engine 540. The downmix transcoder 590 is therefore adapted to generate the downmix signal 310 based on the control information 600 and the original or incoming downmix signal 310'.

In the stereo case, the SAOC downmix signal 310' may not represent a suitable input for the MPS decoder. An example for such a situation is, if the signal components of one object are included only in the left channel of the SAOC stereo downmix 310', while it should be rendered to the right hemisphere during the MPS mixing process [5]. Then, as shown in FIG. 6(b), the SAOC downmix signal 310' has to be processed by the so-called downmix transcoder 590 before it can be used as input for the MPS decoder 250. The specific properties of this processing stage depend on the actual SAOC side information 520 and the playback configuration 570. Obviously, the relation of the transcoded downmix signal 310 and the loudspeaker channels 330 used for playback can then be expressed by equations (26), (27), too.

It should be noted that SAOC assumes signals corresponding to an ensemble of audio objects as input, whereas in teleconferencing systems, the input typically comprises recorded microphone signals. A conversion of the microphone input signal to a corresponding spatial audio object representation may be useful before SAOC can be applied for determining the desired efficient spatial audio representation of the recorded sound. A possible approach to determine different audio objects from a microphone array input is given by blind source separation techniques such as [3]. Based on the microphone input signals, blind source separation methods exploit the statistical independence of different audio objects to estimate the corresponding audio signals. In case that the configuration of the microphone array is known in advance, additional spatial information with respect to the audio objects can be determined, too [4].

For the sake of simplicity only, it should be noted that throughout the description information and signals carrying the respective information have been identified with the same reference sign. Moreover, the signals and the data lines over which same are transported have also been identified with the same reference signs. Depending on the concrete implementation of an embodiment of the present invention, information may be exchanged between different units or objects by signals transmitted directly over signal lines or by virtue of a memory, a storage location or another mediator (e.g. a latch) coupled in between the respective units or objects. For instance, in the case of processor-based implementation, information may be, for instance, stored in a memory associated with the respective processor. Therefore, information, pieces of information and signals may be synonymously referred to.

Based on the discussion of acoustic echo suppression and parametric spatial audio coding presented in the previous sections, we now present a method for efficiently integrating acoustic echo suppression (AES) into a spatial audio encoder/decoder structure as used in spatial audio telecommunication According to an embodiment of the present invention.

Figure 7:
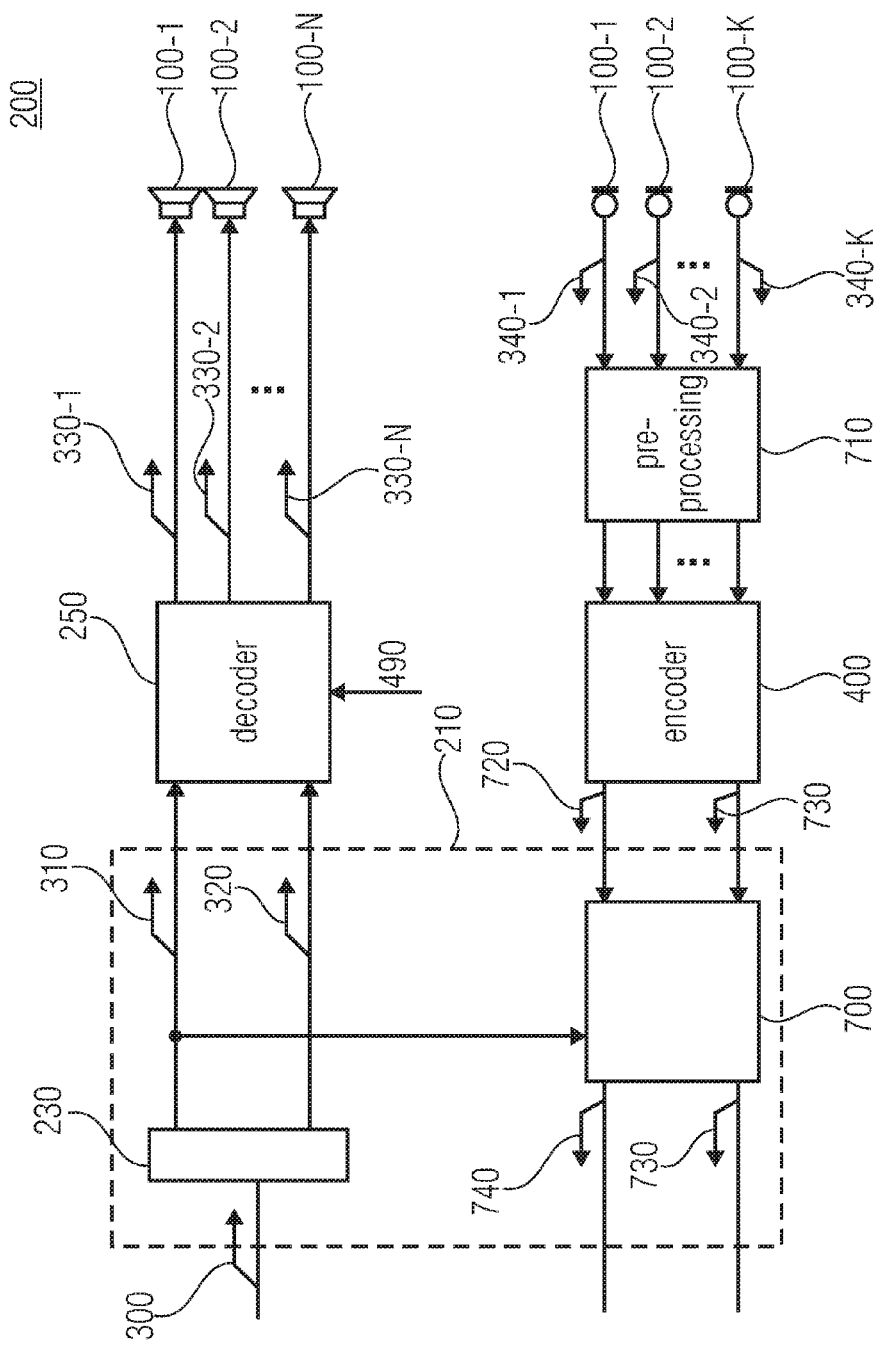
FIG. 7 shows a conferencing front-end according to an embodiment of the present invention to illustrate the proposed efficient approach of acoustic echo suppression based on the downmix of parametric spatial audio coders.

The general structure of the proposed approach is illustrated in FIG. 7. FIG. 7 shows a conferencing front-end 200 according to an embodiment of the present invention, wherein the acoustic echo suppression is based on the downmix signals of parametric spatial audio coders.

The conferencing front-end 200 as shown in FIG. 7 comprises an acoustic echo suppression unit 210 according to an embodiment of the present invention with an input interface 230, which is coupled to an echo removal or echo suppression unit 700 such that a downmix signal 310 comprised in an input signal 300 provided to the input interface 230 is provided thereto. In the embodiment shown in FIG. 7, parametric side information 320, also separated from the input signal 300 by the input interface 230, are not provided to the echo suppression unit 700.

Both, the downmix signal 310 as well as the parametric side information 320 are provided to a multichannel decoder 250, which is output-wise coupled to a plurality of loudspeakers 100-1, ..., 100-N. The decoder 220 provides to each of the loudspeakers 100 a corresponding loudspeaker signal 330-1, ..., 330-N.

The conferencing front-end 200 further comprises a plurality of microphones 110-1, ..., 110-K which provides acoustic input signals to the conferencing front-end 200. In contrast, the loudspeakers 100 provide the equivalent acoustic output. The microphones 110 are coupled to a processing unit 710 and further to an encoder 400, which is adapted to generate a further downmix signal 720 and further parametric side information 730 corresponding to the pre-processed microphone signals received from the microphones 110. The echo suppression unit 700 is coupled to the encoder 400 such that the echo suppression unit 700 is capable of receiving both, the further downmix signal 720 and the further side information 730. At an output, the echo suppression unit 700 provides a modified downmix signal 740 along with the further parametric side information 730 which passes through the echo suppression unit 700 without being altered.

Figure 8:
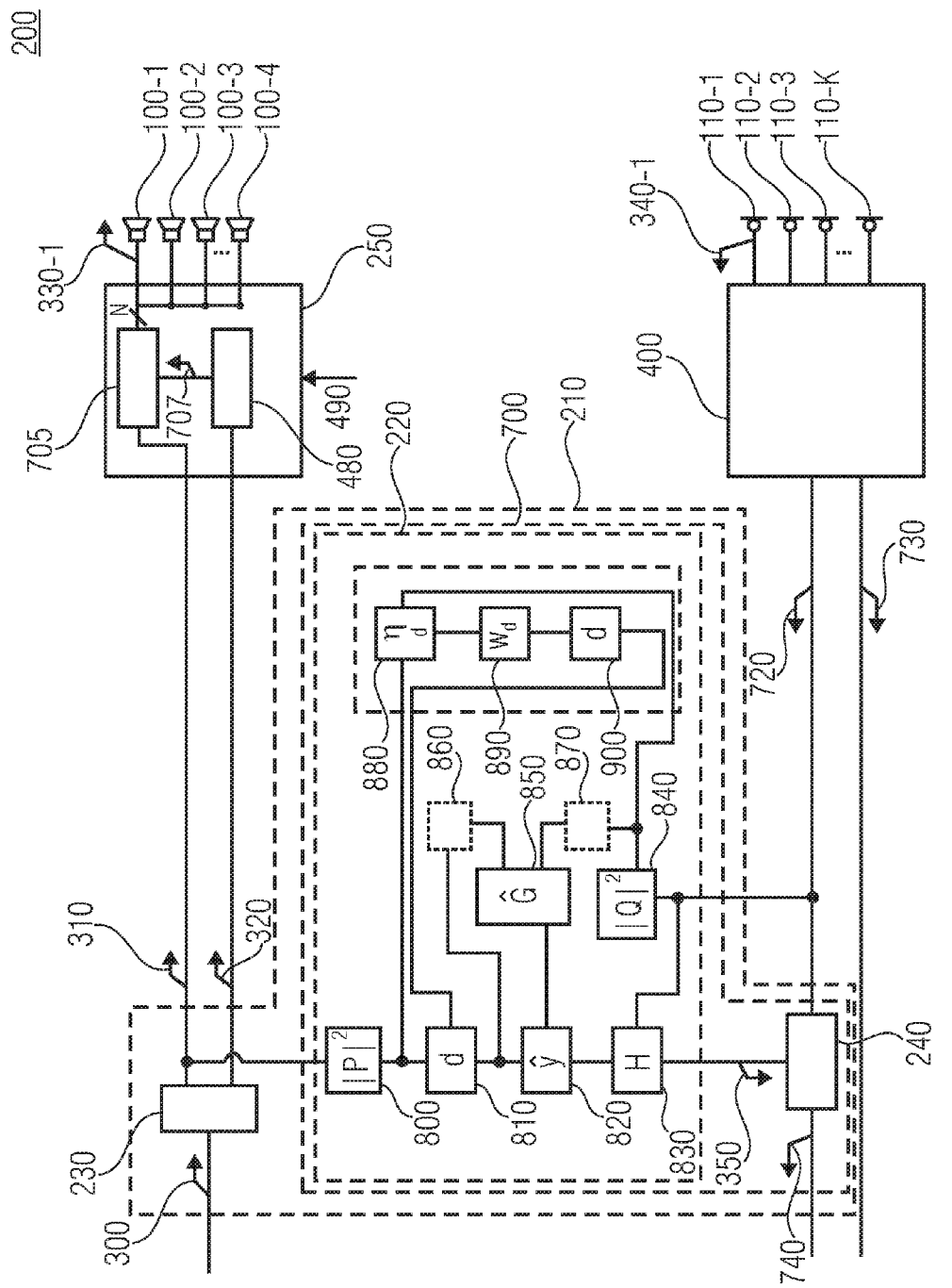
FIG. 8 illustrates a further embodiment according to the present invention in the form of a conferencing front-end comprising an acoustic echo suppression unit according to an embodiment of the present invention.

The echo suppression unit 700 will be outlined in more detail with respect to FIG. 8 and comprises a calculator 220 and the adaptive filter 240 as shown in FIG. 1.

Here, a spatial audio communication application is considered, where we assume that the spatial audio scenes at the far-end and at the near-end are represented by spatial audio streams which are transmitted between the different subscribers. Since hands-free operation is often essential in case of surround playback with multiple loudspeakers, an AES unit 210 may be useful to remove annoying echoes in the output of the near-end's decoder. In contrast to previous methods described above, where the AES is performed based on the loudspeaker signals, we propose to perform the AES solely based on the downmix signal 310 of the spatial audio stream 300 received from the far-end. Since the number of downmix channels is in general much lower than the number of loudspeaker signals used for the playback, the proposed method is significantly more efficient with respect to complexity. The AES can be applied to either the microphone signals at the near-end, or, even more efficiently, to the downmix signal of the near-end's encoder output, as illustrated in FIG. 7.

Before describing the echo suppression unit 700 in more detail in context with FIG. 8, in the following the process or method according to an embodiment of the present invention will be described in more detail.

First, a reference power spectrum (RPS) of the playback signals $P(k, m)$ based on the downmix signal 310 of the received spatial audio stream is computed. In the general case of an N-channel downmix signal $B(k, m) = [B_1(k, m), B_i(k, m), \ldots, B_N(k, m)]$, this can be performed according to a linear combination $$|P(k, m)|^2 = \sum_{i=0}^{N-1} a_i(k, m)|B_i(k, m)|^2. \tag{28}$$

Alternatively, the linear combination can be computed with respect to the complex spectra of the downmix channels $$|P(k, m)|^2 = \left|\sum_{i=0}^{N-1} a_i(k, m)B_i(k, m)\right|^2. \tag{29}$$

The weighting factors $a_i(k, m)$ may be used to control the contribution of the different downmix channels to the RPS.

A different weighting of the channels may be, for instance, beneficial in the context of SAOC. When the input of the AES is determined before the downmix transcoder is applied to the SAOC downmix signal (see FIG. 6(b)), the time-variant behavior of the downmix transcoder may not have to be modeled by the echo estimation filter, but is already captured by the computation of the reference power spectrum.

For the special case of a mono downmix signal, it is reasonable to simply choose the RPS equal to the power spectrum of the downmix signal, i.e., $|P(k, m)|^2 = |B(k, m)|^2$.

In other words, the weighting coefficients $a_i(k, m)$ are chosen to be one for the single downmix channel comprised in the downmix signal 310.

Analogously to equations (28), (29), we compute an RPS $Q(k, m)$ of the recorded signals based on the K-channel downmix signal $A(k, m) = [A_1(k, m), A_i(k, m), \ldots, A_K(k, m)]$ of the near-end's encoder:

$$|Q(k, m)|^2 = \sum_{i=0}^{K-1} c_i(k, m)|A_i(k, m)|^2. \tag{30}$$

Alternatively, the linear combination may be computed with respect to the complex spectra of the downmix channels $$|Q(k,m)|^2 = \left|\sum_{i=0}^{K-1} c_i(k,m)A_i(k,m)\right|^2. \quad (31)$$

The weighting factors $c_i(k, m)$ may be used to control the contribution of the different downmix channels to the RPS.

As before, we can simply use $|Q(k,m)|^2=|A(k,m)|^2$ in case of a mono downmix signal ($c_i(k, m)=1$).

The downmix signal $A(k, m)$ and, thus also the RPS $|Q(k,m)|^2$, contain typically undesired echo components resulting from a feedback of the loudspeaker signals. An estimate $|\hat{Y}(k,m)|^2$ of the echo components $|Q(k,m)|^2$ is computed based on a delayed version of the RPS $|P(k,m)|^2$ and an estimate of echo power transfer function according to $$|\hat{Y}(k,m)|^2 = |\hat{G}(k,m)|^2 |P(k-d,m)|^2. \quad (32)$$

Analogously to the description above, $|\hat{G}(k,m)|^2$ is called echo estimation filter (EEF) in the following.

This estimate is then used to determine an echo suppression filter (ESF), e.g., analogously to (5):

$$H(k,m) = \left(\frac{|Q(k,m)|^\alpha - \beta|\hat{Y}((k,m))|^\alpha}{|Q((k,m))|^\alpha}\right)^{\frac{1}{\gamma}}, \quad (33)$$

where $\alpha$, $\beta$, and $\gamma$ represent design parameters to control the echo suppression performance. Typical values for $\alpha$, $\beta$, and $\gamma$ have been given above.

The Removal of the undesired echo components is finally obtained by multiplying the channels of the original downmix signal of the near-end's encoder with the ESF $$E_{A,i}(k,m) = H(k,m)A_i(k,m). \quad (34)$$

The estimation of the EEF can be based on a correlation with respect to the RPSs according to $$|\hat{G}(k,m)|^2 = \frac{E\{|P(k-d,m)|^2|Q(k,m)|^2\}}{E\{|P(k-d,m)|^2|P(k-d,m)|^2\}}. \quad (35)$$

Alternatively, the EEF filter can be estimated using temporal fluctuations of the RPSs, i.e., analogously to (12):

$$|\hat{G}(k,m)|^2 = \frac{E\{\tilde{P}(k-d,m)\tilde{Q}(k,m)\}}{E\{\tilde{P}(k-d,m)\tilde{P}(k-d,m)\}}, \quad (36)$$

where the temporal fluctuations of the RPSs are computed according to $$\tilde{Q}(k,m) = |Q(k,m)|^2 - E\{|Q(k,m)|^2\} \quad (37)$$

$$\tilde{P}(k-d,m) = |P(k-d,m)|^2 - E\{|P(k-d,m)|^2\}. \quad (38)$$

The estimation of the delay parameter d may be performed analogously to (13), when replacing the loudspeaker and microphone signals $X(k, m)$ and $Z(k, m)$ by the corresponding RPS $P(k, m)$ and $Q(k, m)$, respectively.

It should be mentioned that typically there is no meaningful phase relation between the downmix signals $A(k, m)$ and $B(k, m)$. This is because their phases are related not only through the frequency response of the room, but also by the highly time-variant process of determining the loudspeaker signals from the downmix signal and the spatial side information. Thus, approaches which use the phase information to estimate the EEF (or the delay), such as (8), are not suitable when performing the echo removal based on the downmix signals.

It is worth mentioning that the same reasoning holds for the case that echo cancellation using linear adaptive filtering techniques should be applied with respect to the downmix signals. Such adaptive filters would have to model and track the highly time-variant changes caused by the mapping of the downmix signal to the loudspeaker channels.

FIG. 8 shows a block diagram of a conferencing front-end 200 according to an embodiment of the present invention, which is fairly similar to the one shown in FIG. 1. Accordingly, reference is made to the description of FIG. 1.

The conferencing front-end 200 also comprises an acoustic echo suppression unit 210 according to an embodiment of the present invention, which in turn comprises a calculator 220 for performing essentially the same functionality as described in context with FIG. 1. However, in the following a more detailed description will be given.

The conferencing front-end 200 further comprises and input interface 230 and an adaptive filter 240. The conferencing front-end 200 further comprises a multichannel decoder 250, which is coupled to a plurality of loudspeakers 100-1, . . . , 100-N. The conferencing front-end 200 further comprises a corresponding encoder or multichannel encoder 400, which in turn is coupled to a plurality of microphones 110-1, . . . , 110-K.

To be a little more specific, an input signal 300 is provided to the input interface 230 from the far-end of a communication system underlying the front-end 200. In the embodiment shown in FIG. 8, the input interface 230 separates a downmix signal 310 and parametric side information 320 from the input signal and provides same as the input signals to the multichannel decoder 250. Inside the multichannel decoder 250 the two signals, the downmix signal 310 and the parametric side information 320, are decoded into a plurality of corresponding loudspeaker signals 330, which are then provided to the respective loudspeakers 100. For the sake of simplicity, only the first loudspeaker signal 330-1 is labeled as such.

The decoder 250 comprises, in the embodiment shown in FIG. 8, an upmixer 705 and a parameter processor 480. The upmixer 705 is coupled to the input interface 230 and adapted to receive the downmix signal 310. Similarly, the parameter processor 480 is also coupled to the input interface 230, but adapted to receive the parametric side information 320. The upmixer 705 and the parameter processor 480 are interconnected such that upmix control information 707 derived from the parametric side information 320 may be transmitted to the upmixer 705. The upmixer 705 is also coupled to the loudspeakers 100.

With respect to its functionality, the upmixer 705 is adapted to generate the loudspeaker signals 330 from the downmix signal 310 based on the upmix control information 707 derived from the parametric side information 320. For each of the N (N being an integer) loudspeakers 100-1, . . . , 100-N, the upmixer 705 provides an individual loudspeaker signal 330.

As discussed before, the decoder 250 may optionally comprise an interface, which extracts the side information 320 and the downmix 310 and provides same to the parameter processor 480 and the upmixer 705, respectively, in case the input interface 230 is not shared by the decoder 250 and the acoustic echo suppression unit 710.

As already described in context with FIG. 1, an output of the input interface 230 is coupled to the calculator 220 to provide the downmix signal 310 to the calculator 220. In other words, the calculator 220 is adapted to receive the downmix signal 310.

Before describing the internal structure of the calculator 220 in more detail, it should be noted that the microphones 110 provide a respective number K (K being an integer) of microphone signals 340, of which only the first microphone signal 340-1 is labeled as such in FIG. 8 to the multichannel encoder 400.

Based on the received microphone signals 340 the multichannel encoder 400 generates a further downmix signal 720 and further parametric side information 730 based on the received microphone signals. While the further parametric side information 730 are provided to an output of the conferencing system 200, the further downmix signal 720 is provided to both, the calculator 220 and the adaptive filter 240. The calculator 220 also provides a filter coefficient signal 350 to the adaptive filter 240 on the basis of which the further downmix signal 720 is filtered to obtain a modified downmix signal 740 at an output of the adaptive filter 240. The modified downmix signal 740 represents an echo-suppressed version of the incoming further downmix signal 720. As a consequence, on the receiver side of the further downmix signal 720 and the further parametric side information 730 an echo-suppressed version of the microphone signal received by the microphones 110 may be reconstructed.

With respect to the internal structure of the calculator 220, the downmix signals 310 from the input interface 330 is provided to the first reference power spectrum generator 800 which is adapted to generate the previously described reference power spectrum, for instance, according to equations (28) and (29). An output of the first reference power generator 800 is coupled to an optional delayer 810, which is adapted to delay an incoming signal by a delay value d. An output of the delayer 810 is then coupled to an echo estimator 820, which may be, for instance, adapted to calculate an echo estimation according to equation (38). An output of the echo estimator 820 is then coupled to an input of echo suppression filter generator 830, which generates or estimates the echo suppression filter according to equation (33). An output of the echo suppression filter generator 830 is the filter coefficient signal 350 comprising the filter coefficient, which is provided to the adaptive filter 240.

The further downmix signal 720 as generated by the encoder 400 is provided to the echo suppression filter generator 830, if this circuit comprises a second reference power spectrum generator 840 or is provided to the second reference power spectrum generator 840. To achieve this, the acoustic echo suppression unit 210 may optionally comprise an additional or further input interface to extract the further downmix signal 720, if requested.

An output of the second reference power spectrum generator 840 is then coupled to an echo estimation filter coefficient generator, which in turn is coupled to the echo estimator 820 to provide the echo estimation filter coefficients according to equation (35) or (36) to the echo estimator 820. In case the echo estimation filter coefficient generator 850 operates based on equation (36), optional first and second temporal fluctuation compensators 860, 870 are coupled in between the echo estimation filter coefficient generator 850 and an output of the delayer 810 and the second reference power spectrum generator 840, respectively. The two temporal fluctuation compensators 860, 870 may then be adapted to calculate modified reference power spectra based on equations (37) and (38), respectively. Then, the echo estimation filter coefficient generator 850 may use the modified reference power spectra to operate based on equation (36).

It should be noted that the delayer 810 is not a necessitated, but often useful component. A determination of the delay value d may be achieved based on computations according to equations (13), (14) and (15). To be more precise, an embodiment according to the present invention may therefore comprise a coherence calculator 880, which input-wise is coupled to an output of the first reference power spectrum generator 800. Furthermore, the coherence calculator 880 is also coupled to an output of the second reference power spectrum generator 840 to provide the coherence calculator 880 with a respective reference power spectrum.

For instance, based on equation (13) but with the two reference power spectra as provided by the two reference power spectrum generators 800, 840 the coherence calculator 880 may generate values of a coherence function according to equation (13) to an echo prediction gain calculator 890, which calculates the echo predication gain $\omega_d(k)$ according to or based on equation (14). An output of the echo prediction gain calculator is then coupled to an input of an optimizer 900, which may be adapted to optimize the delay value d according to equation (15). To provide the delay value d to the delayer 810, the optimizer 900 is coupled to the delayer 810 and the delayer 810 is adapted to receive the delay value d. Naturally, the delayer is also in this case adapted to delay the incoming signal (here the first reference power spectrum) by the delay value d.

For the sake of completeness also the echo suppression unit 700 is shown in FIG. 8, which comprises a calculator 220 as well as the adaptive filter 240 as already outlined in the context of FIG. 7.

In the remainder of this section we will present practical variations of the above method for downmix signal based echo suppression.

We can obtain a variation of equation (32) according to $$|\hat{Y}(k, m)|^2 = |\hat{G}(k, m)P(k-d, m)|^2, \qquad (39)$$

where the complex reference spectrum of the playback signals P(k, m) is computed with respect to the complex spectra of the downmix channels, i.e., according to $$P(k, m) = \sum_{i=0}^{N-1} a_i(k, m)B_1(k, m). \qquad (40)$$

Equation (40) results from (29) by discarding the magnitude computation.

Another modification of the AES approach can be obtained by performing the echo suppression not on the downmix channels, as proposed by (34), but with respect to the microphone input signals instead. In other words, the echo suppression is performed on the originally recorded microphone signals before it is used as input for the near-end's encoder or any pre-processing stage, respectively.

Many embodiments according to the present invention therefore share the following features:
1. Receiving a first parametric spatial audio representation, consisting of a downmix signal together with side information, which is used to generate multichannel loudspeaker signals.

2. Receiving a second parametric spatial audio representation, consisting of a downmix signal together with side information, which has been determined from recorded microphone signals.
3. Computing a reference power spectrum of the first and the second downmix signals.
4. Computing an echo estimation filter for estimating the echo components in the reference power spectrum of the second downmix signal.
5. Computing an echo removal filter from the reference power spectrum of the first downmix signal, the reference power spectrum of the second downmix signal, and the echo estimation filter to remove the echo components in the downmix signal of the second spatial audio representation.

Depending on certain implementation requirements of embodiments of inventive methods, embodiments of the inventive methods may be implemented in hardware or in software. The implementation can be performed using a digital storage medium, in particular, a disc, a CD or a DVD having electronically readable control signal installed thereon which cooperate with a programmable computer or processor such that an embodiment of the inventive methods is performed. Generally, an embodiment of the present invention is, therefore, a computer program product where the program code stored on a machine-readable carrier, the program code being operative to perform an embodiment of the inventive method, when the computer program product runs on the computer of the processor. In other words, embodiments of the inventive methods are, therefore, a computer program having program code for performing at least one of the embodiments of the inventive method, when the computer programs runs on the computer processor. A processor may be formed by a computer, a chip card, a smart card, an application specific integrated circuit (ASIC) or another integrated circuit.

Embodiments according to the present invention may furthermore be implemented based on discrete electrical or electronical elements, integrated circuits or combinations thereof.

Embodiments according to the present invention enable therefore an acoustic echo control for parametric spatial audio reproduction. As the previous discussion has shown, embodiments may represent an efficient method for the suppression of acoustic echoes for multichannel loudspeaker systems used in spatial audio communication systems. The methods are applicable in cases that the spatial audio signals are represented by a downmix signal and corresponding parametric side information or meter data. Embodiments exploit the fact that the echo suppression may be performed directly based on the received downmix signal rather than explicitly computing the loudspeaker signals before they are input into an acoustic echo suppression. Analogously, the echo components may also be suppresses in the downmix signal of the spatial audio signal to be transmitted to the far-end.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] ISO/IEC 23003-1:2007. Information technology—MPEG Audio technologies—Part 1: MPEG Surround. International Standards Organization, Geneva, Switzerland, 2007.

[2] E. Benjamin and T. Chen. The native B-format microphone: Part I. In 119th AES Convention, Paper 6621, New York, October 2005.

[3] H. Buchner, R. Aichner, and W. Kellermann. A generalization of blind source separation algorithms for convolutive mixtures based on second order statistics. IEEE trans. on Speech and Audio Processing, 13(1):120-134, January 2005.

[4] H. Buchner, R. Aichner, J. Stenglein, H. Teutsch, and W. Kellermann. Simultaneous localization of multiple sound sources using blind adaptive MIMO filtering. In Proc. IEEE Int. Conf on Acoustics, Speech, and Signal Processing (ICASSP), Philadelphia, March 2005.

[5] J. Engdegård, B. Resch, C. Falch, O. Hellmuth, J. Hilpert, A. Hoelzer, L. Terentiev, J. Breebaart, J. Koppens, E. Schuijers, and W. Oomen. Spatial audio object coding (SAOC)—the upcoming MPEG standard on parametric object based audio coding. In 124th AES Convention, Paper 7377, Amsterdam, May 2008.

[6] A. Favrot et. al. Acoustic echo control based on temporal fluctuations of short-time spectra. In Proc. Intl. Works. on Acoust. Echo and Noise Control (IWAENC), Seattle, September 2008, submitted.

[7] W. Etter and G. S. Moschytz. Noise reduction by noise-adaptive spectral magnitude expansion. J. Audio Eng. Soc., 42:341-349, May 1994.

[8] C. Faller and C. Tournery. Estimating the delay and coloration effect of the acoustic echo path for low complexity echo suppression. In Proc. Intl. Works. on Acoust. Echo and Noise Control (IWAENC), September 2005.

[9] A. Favrot, C. Faller, M. Kallinger, F. Kuech, and M. Schmidt. Acoustic echo control based on temporal fluctuations of short-time spectra. In Proc. Intl. Works. on Acoust. Echo and Noise Control (I WAENC), September 2008.

[10] Jürgen Herre, Kristofer Kjorling, Jeroen Breebaart, Christof Faller, Sascha Disch, Heiko Purnhagen, Jeroen Koppens, Johannes Hilpert, Jonas Roden, Werner Oomen, Karsten Linzmeier, and Kok Seng Chong. MPEG Surround—The ISO/MPEG Standard for efficient and compatible multichannel audio coding. J. Audio Eng. Soc., 56(11):932-955, November 2008.

[11] J. Merimaa. Applications of a 3-D microphone array. In 112th AES Convention, Paper 5501, Munich, May 2002.

[12] V. Pulkki. Spatial sound reproduction with directional audio coding. J. Audio Eng. Soc., 55(6):503-516, June 2007.

[13] G. Schmidt and E. Hansler. Acoustic echo and noise control: a practical approach. Hoboken: Wiley, 2004.

The invention claimed is:

1. A method for suppressing an acoustic echo, comprising:
   extracting a downmix signal from an input signal comprising the downmix signal and parametric side information, wherein the downmix signal and the parametric side information together represent a multichannel signal comprising at least further channels or a channel number higher than the number of channels in the downmix signal;
   calculating filter coefficients for adaptive filtering based on the downmix signal and the microphone signal or a signal derived from the microphone signal;
   adaptively filtering the microphone signal or the signal derived from the microphone signal based on the filter coefficients to suppress an echo caused by the multichannel signal in the microphone signal.

2. The method according to claim 1, further comprising decoding the downmix signal and the parametric side information into a plurality of loudspeaker signals.

3. Method of providing a plurality of loudspeaker signals and a microphone signal, comprising:
a method of suppressing an acoustic echo, comprising:
extracting a downmix signal from an input signal comprising the downmix signal and parametric side information, wherein the downmix signal and the parametric side information together represent a multichannel signal comprising at least further channels or a channel number higher than the number of channels in the downmix signal;
calculating filter coefficients for adaptive filtering based on the downmix signal and the microphone signal or a signal derived from the microphone signal;
adaptively filtering the microphone signal or the signal derived from the microphone signal based on the filter coefficients to suppress an echo caused by the multichannel signal in the microphone signal;
a step of multichannel decoding;
a step of receiving a microphone signal,
wherein, in the step of multichannel decoding, the downmix signal and the parametric side information are decoded to acquire a plurality of loudspeaker signals.

4. A non-transitory computer readable medium including a computer program for performing, when running on a processor, a method for suppressing an acoustic echo, the method comprising:
extracting a downmix signal from an input signal comprising the downmix signal and parametric side information, wherein the downmix signal and the parametric side information together represent a multichannel signal comprising at least further channels or a channel number higher than the number of channels in the downmix signal;
calculating filter coefficients for adaptive filtering based on the downmix signal and the microphone signal or a signal derived from the microphone signal;
adaptively filtering the microphone signal or the signal derived from the microphone signal based on the filter coefficients to suppress an echo caused by the multichannel signal in the microphone signal.

5. A non-transitory computer readable medium including a computer program for performing, when running on a processor, a method of providing a plurality of loudspeaker signals and a microphone signal, the method comprising:
a method of suppressing an acoustic echo, comprising:
extracting a downmix signal from an input signal comprising the downmix signal and parametric side information, wherein the downmix signal and the parametric side information together represent a multichannel signal comprising at least further channels or a channel number higher than the number of channels in the downmix signal;
calculating filter coefficients for adaptive filtering based on the downmix signal and the microphone signal or a signal derived from the microphone signal;
adaptively filtering the microphone signal or the signal derived from the microphone signal based on the filter coefficients to suppress an echo caused by the multichannel signal in the microphone signal;
a step of multichannel decoding;
a step of receiving a microphone signal,
wherein, in the step of multichannel decoding, the downmix signal and the parametric side information are decoded to acquire a plurality of loudspeaker signals.

* * * * *